United States Patent
Onishi (10) Patent No.: US 8,851,577 B2
(45) Date of Patent: Oct. 7, 2014

(54) CAP ATTACHMENT STRUCTURE AND CAP

(75) Inventor: Satoshi Onishi, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 266 days.

(21) Appl. No.: 13/110,544

(22) Filed: May 18, 2011

(65) Prior Publication Data

US 2011/0291464 A1 Dec. 1, 2011

(30) Foreign Application Priority Data

May 28, 2010 (JP) .................................. 2010-123407

(51) Int. Cl.
*B60B 7/08* (2006.01)

(52) U.S. Cl.
CPC ........................................ *B60B 7/08* (2013.01)
USPC .................... 301/37.31; 301/108.1; 301/37.35

(58) Field of Classification Search
CPC ................ B60B 7/04; B60B 7/06; B69B 7/08
USPC .................... 301/108.1, 108.3, 37.31, 37.101, 301/37.102, 37.33, 37.34, 37.35, 37.42
See application file for complete search history.

(56) References Cited

U.S. PATENT DOCUMENTS

| 2,902,316 | A | * | 9/1959 | Black | 301/37.109 |
| 4,457,560 | A | * | 7/1984 | Rowe et al. | 301/37.42 |
| 6,546,892 | B2 | * | 4/2003 | Kelly et al. | 116/216 |
| 7,651,171 | B2 | * | 1/2010 | Kinslow et al. | 301/37.31 |
| 2008/0290722 | A1 | * | 11/2008 | Koschinat | 301/108.1 |
| 2010/0181339 | A1 | * | 7/2010 | Pottish et al. | 222/107 |

FOREIGN PATENT DOCUMENTS

| EP | 1992500 A1 | 11/2008 |
| JP | 57013301 | * 1/1982 |
| JP | S57-013301 | 1/1982 |
| JP | S60-148101 | * 10/1985 |
| JP | 10-297203 A | 11/1998 |

OTHER PUBLICATIONS

Japanese Office Action mailed Aug. 12, 2013 and partial English translation of Notice of Reasons for Rejection.

* cited by examiner

*Primary Examiner* — Kip T Kotter
*Assistant Examiner* — Jean Charleston
(74) *Attorney, Agent, or Firm* — Robert Mlotkowski Safran & Cole P.C.

(57) ABSTRACT

There is provided a cap attachment structure, including: a cap that is attached to a wheel of a vehicle; a first elastic deformation portion that is provided at the cap, the first elastic deformation portion being elastically deformed and engaging with the wheel while the cap is attached to the wheel; and a second elastic deformation portion that is provided at the cap, the second elastic deformation portion not being elastically deformed while the cap is attached to the wheel, and the second elastic deformation portion being elastically deformed by engaging with the wheel when the cap is detached from the wheel.

4 Claims, 4 Drawing Sheets

CAP ATTACHMENT STRUCTURE AND CAP

CROSS-REFERENCE TO RELATED APPLICATION

This application claims priority under 35 USC 119 from Japanese Patent Application No. 2010-123407 filed on May 28, 2010, the disclosure of which is incorporated by reference herein.

BACKGROUND

1. Technical Field

The invention relates to a cap attachment structure that attaches a cap to a vehicle wheel, and relates to the cap attached to the vehicle wheel.

2. Related Art

For example, in a cap attachment structure, a latch piece that is integrated with a cap portion made of resin engages a tire wheel to attach a wheel center cap to the tire wheel (for example, see Japanese Patent Application Laid-Open No. 10-297203).

In the state in which the wheel center cap is attached to the tire wheel, the latch piece is elastically deformed to engage the tire wheel, thereby retaining the wheel center cap in the tire wheel. Therefore, a bending stress acts on a latch pawl.

In addition, because the wheel center cap is disposed near an axle of the vehicle, heat generated by a brake operation of the vehicle is transferred from the axle to the wheel center cap through the tire wheel.

Because the heat is provided to the wheel center cap while the bending stress acts on the latch piece, the latch pawl is deformed by thermal creep, which results in a problem in that possibly a load on which the wheel center cap is detached from the tire wheel is lowered.

SUMMARY

An object of the invention is to provide a cap that can secure the load on which a cap is detached from the wheel even if the heat is provided, and to provide a cap attachment structure that can secure the load on which the cap is detached from the wheel even if the heat is provided to the cap.

A first aspect of the present invention provides a cap attachment structure, including:

a cap that is attached to a wheel of a vehicle;

a first elastic deformation portion that is provided at the cap, the first elastic deformation portion being elastically deformed and engaging with the wheel while the cap is attached to the wheel; and a second elastic deformation portion that is provided at the cap, the second elastic deformation portion not being elastically deformed while the cap is attached to the wheel, and the second elastic deformation portion being elastically deformed by engaging with the wheel when the cap is detached from the wheel.

A second aspect of the present invention provides the cap attachment structure of the first aspect, wherein the second elastic deformation portion is moved without being elastically deformed by the wheel, when a temperature at the cap is raised to an assumed maximum temperature and the cap expands while the cap is attached to the wheel.

A third aspect of the present invention provides the cap attachment structure of the second aspect, further including:

a slid portion that is provided at the wheel; and a sliding portion that is provided at the cap, the second elastic deformation portion being moved without being elastically deformed by the wheel when the temperature at the cap is raised to the assumed maximum temperature and the cap expands and slides the sliding portion on the slid portion while the cap is attached to the wheel.

A fourth aspect of the present invention provides the cap attachment structure of the first aspect, further comprising a reinforcement portion that is provided at the cap to include the second elastic deformation portion plurally, the reinforcement portion reinforcing the cap while connecting the second elastic deformation portions.

A fifth aspect of the present invention provides a cap, including:

a main body portion that is attached to a wheel of a vehicle;

a first elastic deformation portion that is provided at the main body portion, the first elastic deformation portion being elastically deformed and engaging with the wheel while the main body portion is attached to the wheel; and a second elastic deformation portion that is provided at the main body portion, the second elastic deformation portion not being elastically deformed while the main body portion is attached to the wheel, and the second elastic deformation portion being elastically deformed by engaging with the wheel when the main body portion is detached from the wheel.

A sixth aspect of the present invention provides the cap of the fifth aspect, wherein the second elastic deformation portion is moved without being elastically deformed by the wheel, when a temperature at the main body portion is raised to an assumed maximum temperature and the main body portion expands while the main body portion is attached to the wheel.

A seventh aspect of the present invention provides the cap of the sixth aspect, further including a sliding portion that is provided at the main body portion, the second elastic deformation portion being moved without being elastically deformed by the wheel when the temperature at the main body portion is raised to the assumed maximum temperature and the main body portion expands and slides the sliding portion on a slid portion provided at the wheel while the main body portion is attached to the wheel.

An eighth aspect of the present invention provides the cap of the fifth aspect, further including a reinforcement portion that is provided at the main body portion to include the second elastic deformation portion plurally, the reinforcement portion reinforcing the second elastic deformation portion and the main body portion while connecting the second elastic deformation portions.

In the cap attachment structure of the first aspect, the first elastic deformation portion is provided in the cap, and the first elastic deformation portion is elastically deformed to engage the wheel while the cap is attached to the wheel of the vehicle. Therefore, the cap is attached to the wheel.

The second elastic deformation portion is also provided in the cap. The second elastic deformation portion engages the wheel when the cap is detached from the wheel, thereby elastically deforming the second elastic deformation portion. Therefore, the second elastic deformation portion causes the detachment load to act on the cap.

Here, the second elastic deformation portion is not elastically deformed while the cap is attached to the wheel. Because the bending stress does not act on the second elastic deformation portion, the deformation caused by the thermal creep can be suppressed in the second elastic deformation portion even if the heat is provided to the second elastic deformation portion. Therefore, the load on which the cap is detached from the wheel can be secured.

In the cap attachment structure of the second aspect, the second elastic deformation portion is moved while not elastically deformed by the wheel, when the temperature at the cap is raised to the assumed maximum temperature to expand the cap while the cap is attached to the wheel. Because the bending stress does not act on the second elastic deformation portion, the deformation caused by the thermal creep can be suppressed in the second elastic deformation portion. Therefore, the load on which the cap is detached from the wheel can be secured.

In the cap attachment structure of the third aspect, the slid portion is provided in the wheel, and the sliding portion is provided in the cap.

Here, the second elastic deformation portion is moved while not elastically deformed by the wheel, when the cap is expanded to be slid on the slid portion by raising the temperature at the cap to the assumed maximum temperature while the cap is attached to the wheel. Because the bending stress does not act on the second elastic deformation portion, the deformation caused by the thermal creep can be suppressed in the second elastic deformation portion. Therefore, the load on which the cap is detached from the wheel can be secured.

In the cap attachment structure of the fourth aspect, the plural second elastic deformation portions are provided.

The reinforcement portion is provided in the cap, and the reinforcement portion reinforces the cap while connecting the second elastic deformation portions.

The reinforcement portion can suppress the deformation of the cap (including the second elastic deformation portion) when the cap is detached from the wheel, and therefore the load on which the cap is detached from the wheel can further be secured.

In the cap of the fifth aspect, the first elastic deformation portion is provided in the main body portion, and the first elastic deformation portion is elastically deformed to engage the wheel while the main body portion is attached to the wheel of the vehicle. Therefore, the main body portion is attached to the wheel.

The second elastic deformation portion is also provided in the main body portion, and the second elastic deformation portion engages the wheel to be elastically deformed when the main body portion is detached from the wheel. Therefore, the second elastic deformation portion causes the detachment load to act on the main body portion.

Here, the second elastic deformation portion is not elastically deformed while the main body portion is attached to the wheel. Because the bending stress does not act on the second elastic deformation portion, the deformation caused by the thermal creep can be suppressed in the second elastic deformation portion even if the heat is provided to the second elastic deformation portion. Therefore, the load on which the main body portion is detached from the wheel can be secured.

In the cap of the sixth aspect, the second elastic deformation portion is moved while not elastically deformed by the wheel, when the temperature at the main body portion is raised to the assumed maximum temperature to expand the main body portion while the main body portion is attached to the wheel. Because the bending stress does not act on the second elastic deformation portion, the deformation caused by the thermal creep can be suppressed in the second elastic deformation portion. Therefore, the load on which the main body portion is detached from the wheel can be secured.

In the cap of the seventh aspect, the second elastic deformation portion is moved while not elastically deformed by the wheel, when the main body portion is expanded to slide the sliding portion provided in the main body portion on the slid portion provided in the wheel by raising the temperature at the main body portion to the assumed maximum temperature while the main body portion is attached to the wheel. Because the bending stress does not act on the second elastic deformation portion, the deformation caused by the thermal creep can be suppressed in the second elastic deformation portion. Therefore, the load on which the main body portion is detached from the wheel can be secured.

In the cap of the eighth aspect, the plural second elastic deformation portions are provided.

The reinforcement portion is provided in the main body portion, and the reinforcement portion reinforces the second elastic deformation portion and the main body portion while connecting the second elastic deformation portions.

Therefore, the deformations of the main body portion and second elastic deformation portion can be suppressed when the main body portion is detached from the wheel. Accordingly, the load on which the main body portion is detached from the wheel can further be secured.

BRIEF DESCRIPTION OF THE DRAWINGS

An exemplary embodiment of the present invention will be described in detail based on the following figures, wherein.

DETAILED DESCRIPTION

Figure 1:
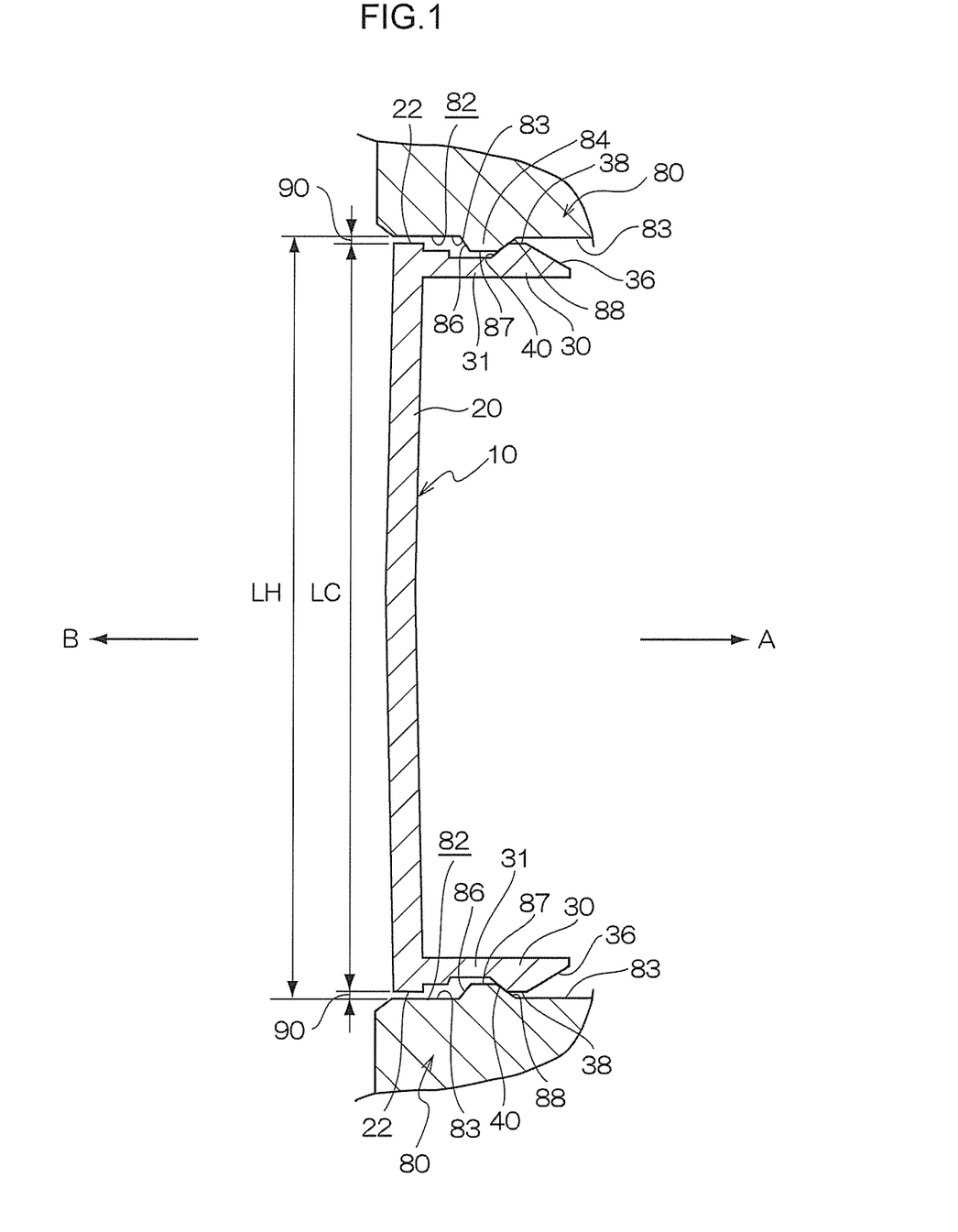
FIG. 1 is a sectional view that is taken along a wheel radial direction and illustrates a state in which a wheel center cap according to an exemplary embodiment of the invention is attached to a vehicle wheel.
Figure 2:
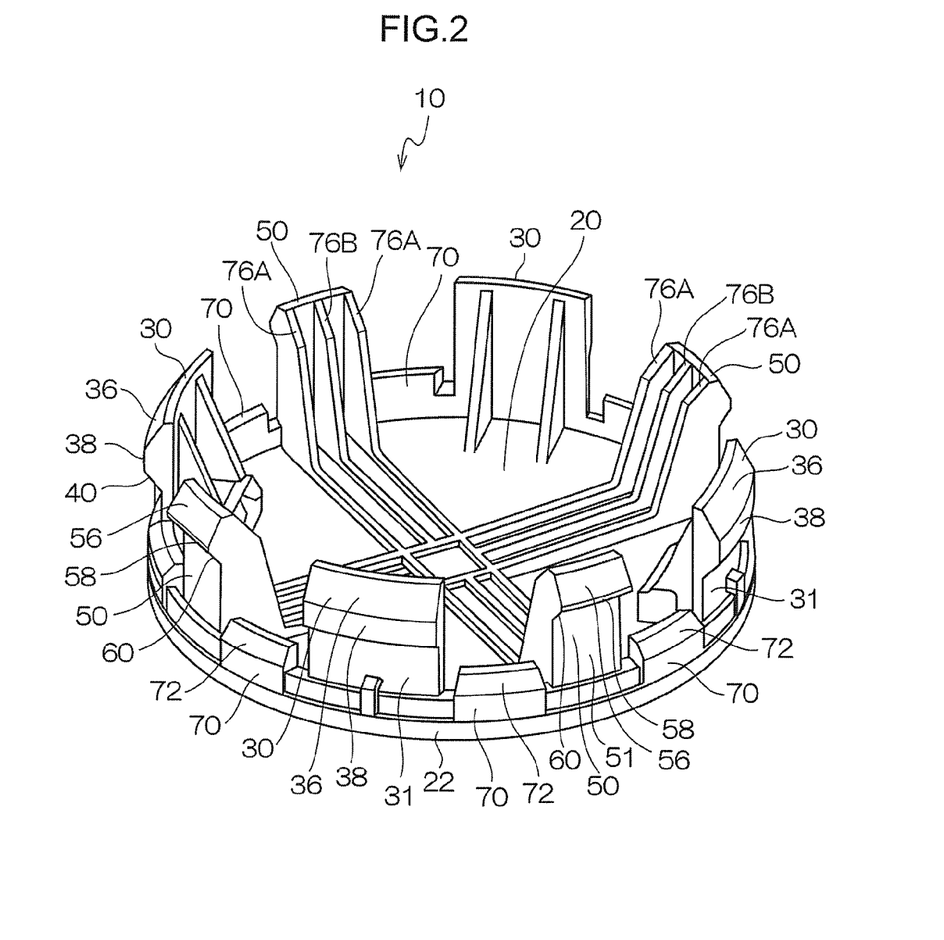
FIG. 2 is a perspective view illustrating a wheel center cap according to an exemplary embodiment of the invention when viewed from an inside in a vehicle width direction.

FIG. 1 is a sectional view illustrating a state in which a wheel center cap 10 as a cap according to an exemplary embodiment of the invention is attached to a wheel 80 of a vehicle. FIG. 2 is a perspective view illustrating the wheel center cap 10 when viewed from an inside in a vehicle width direction. In the drawings, a direction in which the wheel center cap 10 is attached to the wheel 80 (the inside in a direction of a shaft of the wheel 80 and the inside in the vehicle width direction, hereinafter simply referred to as an "attachment direction") is indicated by an arrow A, and a direction in which the wheel center cap 10 is detached from the wheel 80 (the outside in the direction of the shaft of the wheel 80 and the outside in the vehicle width direction, hereinafter simply referred to as a "detachment direction") is indicated by an arrow B.

The wheel center cap 10 of the exemplary embodiment is made of resin. As illustrated in FIG. 1, the wheel center cap 10 is attached to a shaft center portion of the wheel 80 from the detachment direction side while a center shaft line of the wheel center cap 10 is aligned with a center shaft line of the wheel 80 of the vehicle.

The wheel 80 is made of aluminum whose linear expansion coefficient is lower than a linear expansion coefficient of the wheel center cap 10 (resin). An attachment hole 82 having a circular shape in section is made along the vehicle width direction in the shaft center portion of the wheel 80, and the attachment hole 82 is opened onto the detachment direction side. A circular engagement projection 84 as a slid portion is provided in an inner circumferential surface 83 of the attachment hole 82. The engagement projection 84 is formed into a trapezoidal shape in section. The engagement projection 84 is disposed along a circumferential direction of the wheel 80 while projected toward the inside in a radial direction of the wheel 80.

Figure 3:
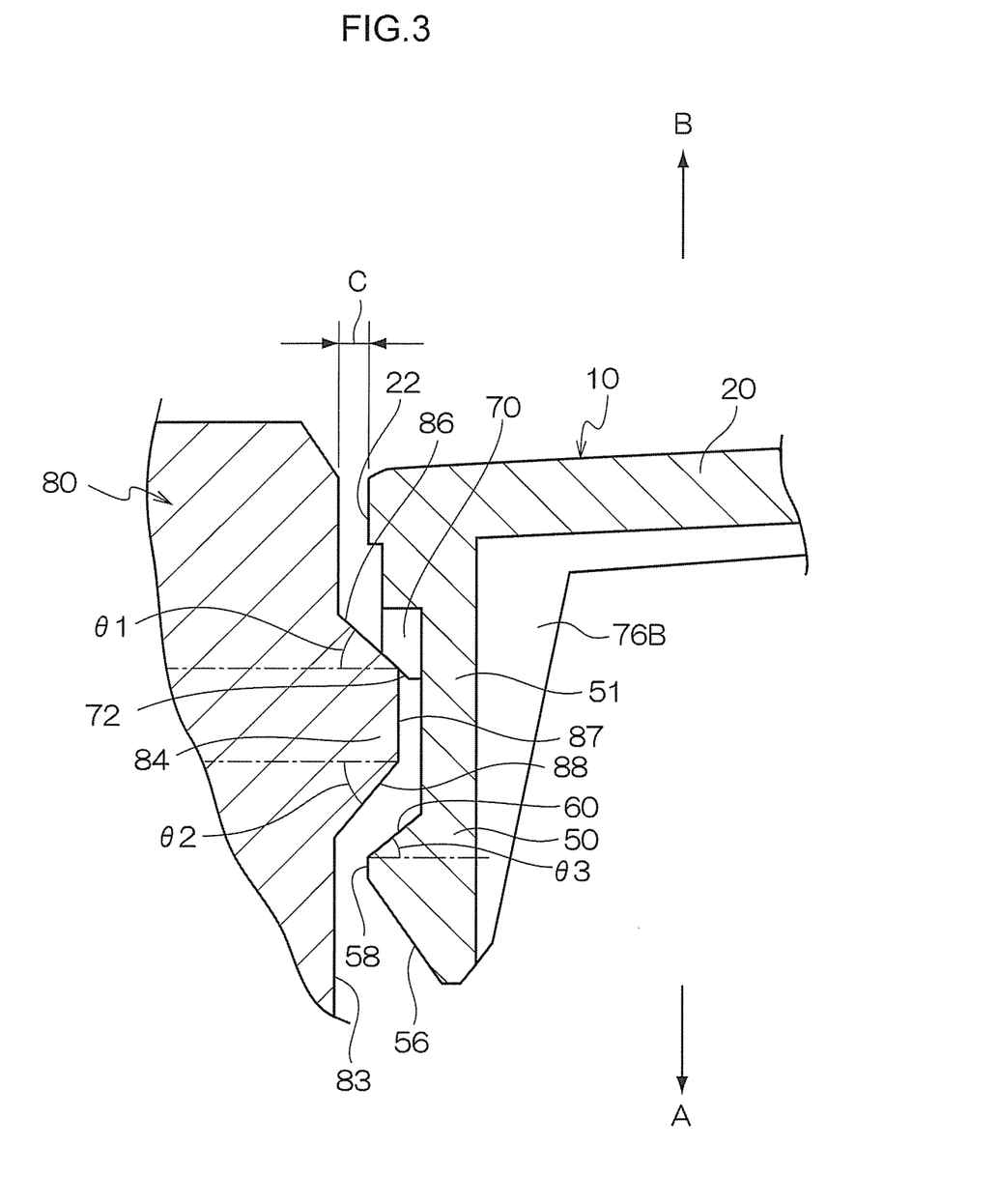
FIG. 3 is a side view illustrating a second latch pawl and a slide pawl of a wheel center cap according to an exemplary embodiment of the invention when the second latch pawl and the slide pawl are viewed in a circumferential direction of the wheel center cap while overlapped with each other.

As illustrated in FIG. 3, in the engagement projection 84, a slope portion 86 is formed on the detachment direction side. On the attachment direction side, the slope portion 86 is inclined toward the inside in the radial direction of the wheel 80, and the slope portion 86 is disposed while inclined by an angle θ1 relative to the radial direction of the wheel 80. In the engagement projection 84, an engagement portion 88 is formed on the attachment direction side. On the attachment direction side, the engagement portion 88 is inclined toward the inside in the radial direction of the wheel 80, and the engagement portion 88 is disposed while inclined by an angle θ2 relative to the radial direction of the wheel 80. In the engagement projection 84, a connecting portion 87 is formed between the slope portion 86 and the engagement portion 88, the connecting portion 87 is disposed perpendicular to the radial direction of the wheel 80, and the connecting portion 87 connects the slope portion 86 and the engagement portion 88.

As illustrated in FIGS. 1 and 2, a cover 20 as a main body portion is provided at an end on the detachment direction side of the wheel center cap 10, the cover 20 is formed into a disc shape, and the shaft center portion of the wheel 80 is covered with the cover 20 from the detachment direction side. On an outer circumference, an outer circumferential surface 22 is formed perpendicular to the radial direction of the cover 20, the outer circumferential surface 22 is disposed along the circumferential direction of the inner circumferential surface 83 of the wheel 80, and the outer circumferential surface 22 is separated from the inner circumferential surface 83 on the inside in the radial direction of the cover 20.

On the attachment direction side in an outer circumferential portion of the cover 20, a first latch pawl 30 as a first elastic deformation portion is integrally provided at predetermined intervals along the circumferential direction of the cover 20, and the first latch pawl 30 is curved along the circumferential direction of the cover 20.

An elastic deformation portion 31 is provided in a portion except a leading end portion of the first latch pawl 30, and the elastic deformation portion 31 extends from the cover 20 toward the attachment direction side. The elastic deformation portion 31 is formed into a plate shape so as to be able to be elastically deformed in the radial direction of the cover 20.

At the leading end portion of the first latch pawl 30, a slope portion 36 is formed on the attachment direction side and the outside in the radial direction of the cover 20. On the detachment direction side, the slope portion 36 is inclined toward the outside in the radial direction of the cover 20. At the leading end portion of the first latch pawl 30, an engagement portion 40 is formed on the detachment direction side and the outside in the radial direction of the cover 20. On the detachment direction side, the engagement portion 40 is inclined toward the outside in the radial direction of the cover 20. At the leading end portion of the first latch pawl 30, a connecting portion 38 is formed between the slope portion 36 and the engagement portion 40, and the connecting portion 38 connects the slope portion 36 and the engagement portion 40 while disposed perpendicular to the radial direction of the cover 20.

The engagement portion 40 of the first latch pawl 30 engages the engagement portion 88 of the wheel 80, thereby regulating the movement of the wheel center cap 10 in the detachment direction. Additionally, the engagement portion 40 engages the engagement portion 88, whereby the elastic deformation portion 31 of the first latch pawl 30 is elastically deformed toward the inside in the radial direction of the cover 20. Therefore, an elastic deformation load of the first latch pawl 30 acts on the wheel 80 to secure a rotation torque (a torque against the wheel 80 of the wheel center cap 10) of the wheel center cap 10.

As illustrated in FIGS. 2 and 3, on the attachment direction side in the outer circumferential portion of the cover 20, a second latch pawl 50 as a second elastic deformation portion is integrally formed at predetermined intervals along the circumferential direction of the cover 20, and the second latch pawl 50 is bent along the circumferential direction of the cover 20 while disposed in the center between the first latch pawls 30.

An elastic deformation portion 51 is provided in a portion except a leading end portion of the second latch pawl 50, and the elastic deformation portion 51 extends from the cover 20 toward the attachment direction side. The elastic deformation portion 51 is formed into a plate shape so as to be able to be elastically deformed in the radial direction of the cover 20.

At the leading end portion of the second latch pawl 50, a slope portion 56 is formed on the attachment direction side and the outside in the radial direction of the cover 20. On the detachment side, the slope portion 56 is inclined toward the outside in the radial direction of the cover 20. At the leading end portion of the second latch pawl 50, an engagement portion 60 is formed on the detachment direction side and the outside in the radial direction of the cover 20. On the attachment direction side, the engagement portion 60 is inclined toward the outside in the radial direction of the cover 20, and engagement portion 60 is disposed while inclined by an angle θ3 relative to the radial direction of the cover 20. The angle θ3 is smaller than the angle θ2. At the leading end portion of the second latch pawl 50, a connecting portion 58 is formed between the slope portion 56 and the engagement portion 60, and the connecting portion 58 connects the slope portion 56 and the engagement portion 60 while disposed perpendicular to the radial direction of the cover 20.

A boundary portion between the connecting portion 58 and engagement portion 60 of the second latch pawl 50 is disposed so as to be separated from the engagement portion 88 of the wheel 80 on the attachment direction side. The connecting portion 58 of the second latch pawl 50 is disposed from the inner circumferential surface 83 of the wheel 80 on the inside in the radial direction of the cover 20. Therefore, the second latch pawl 50 does not abut on the inner circumferential surface 83 and the engagement projection 84, and the elastic deformation portion 51 of the second latch pawl 50 is not elastically deformed.

On the attachment direction side in the outer circumferential portion of the cover 20, a slide pawl 70 as a sliding portion is integrally formed at predetermined intervals along the circumferential direction of the cover 20, and the slide pawl 70 is bent along the circumferential direction of the cover 20 while disposed in the center between the first latch pawl 30 and the second latch pawl 50 such that the slide pawls 70 shown in FIG 2 are angularly offset from the latch pawls. The slide pawl 70 extends from the cover 20 toward the attachment direction side.

At the leading end portion of the slide pawl 70, a slope portion 72 is formed on the outside in the radial direction of the cover 20. On the detachment direction side, the slope portion 72 is inclined toward the inside in the radial direction of the cover 20. The slope portion 72 abuts on the slope portion 86 of the wheel 80 while the slide pawl 70 is not elastically deformed, thereby regulating the movement of the wheel center cap 10 in the attachment direction.

Two pairs of ribs 76A that are of a reinforcement portion are integrally provided on the attachment direction side of the cover 20. In the circumferential direction of the cover 20, each pair of ribs 76A extends between both end portions of the pair of second latch pawls 50. The second latch pawls 50 are opposes to each other in the radial direction of the cover 20.

A rib 76B as a reinforcement portion is integrally provided on the attachment direction side of the cover 20. The rib 76B extends toward the center of the cover 20 from the central portion in the circumferential direction of the cover 20 of the second latch pawl 50 until the rib 76B reaches the rib 76A.

Therefore, the elastic deformation load of the second latch pawl 50 is increased by the ribs 76A and the rib 76B when the second latch pawl 50 is elastically deformed toward the inside in the radial direction of the cover 20. The cover 20 is prevented from being bent while projected toward the detachment direction side by the ribs 76A and the rib 76B when the elastic deformation portion 31 of the first latch pawl 30 and the elastic deformation portion 51 of the second latch pawl 50 are elastically deformed.

The wheel 80 is fixed to an axle (not illustrated) of the vehicle, and a brake device (not illustrated) of the vehicle is installed in the axle. Therefore, heat generated by a brake operation (operation of the brake device) of the vehicle is transferred from the axle to the wheel center cap 10 through the wheel 80.

When the heat generated by the brake operation of the vehicle is transferred from the axle to the wheel center cap 10 through the wheel 80 and provided to the wheel center cap 10 and the wheel 80, the cover 20 and the attachment hole 82 of the wheel 80 are expanded (elongated) toward the outside (direction perpendicular to the attachment) in the radial direction of the cover 20 by the attached heat. At this point, the elastic deformation portion 31 of the first latch pawl 30 is elastically deformed toward the inside in the radial direction of the cover 20. The slope portion 72 of the slide pawl 70 is slid toward the outside in the radial direction of the cover 20 with respect to the slope portion 86 of the wheel 80, thereby moving the wheel center cap 10 in the detachment direction.

Therefore, the leading end portion of the second latch pawl 50 is moved toward the detachment direction and the outside in the radial direction of the cover 20. Even if a temperature at the wheel center cap 10 is raised to an assumed maximum temperature (for example, 130° C.), the leading end portion of the second latch pawl 50 does not abut on the circumferential surface 83 and engagement projection 84 of the wheel 80. This is because of the gap in the detachment direction between the engagement portion 88 and the boundary portion of the connecting portion 58 and engagement portion 60 of the second latch pawl 50 and because of the gap in the radial direction of the cover 20 between the connecting portion 58 of the second latch pawl 50 and the inner circumferential surface 83 of the wheel 80, and the elastic deformation portion 51 of the second latch pawl 50 is not elastically deformed by the wheel 80.

Operation of the exemplary embodiment will be described below.

When the wheel center cap 10 is attached to the wheel 80, each first latch pawl 30 and each second latch pawl 50 of the wheel center cap 10 are inserted in the attachment hole 82 toward the attachment direction while the center shaft line of the wheel center cap 10 is aligned with the center shaft line of the attachment hole of the wheel 80.

In the state in which the wheel center cap 10 is attached to the wheel 80, the elastic deformation portion 31 of the first latch pawl 30 is elastically deformed toward the inside in the radial direction of the cover 20, and the slope portion 72 of the slide pawl 70 abuts on the slope portion 86 of the wheel 80 while the engagement portion 40 of the first latch pawl 30 engages with the engagement portion 88 of the wheel 80. Therefore, the wheel center cap 10 is attached to the wheel 80 without rattling.

In the state in which the wheel center cap 10 is attached to the wheel 80, the leading end portion of the second latch pawl 50 does not abut on the inner circumferential surface 83 and the engagement projection 84 of the wheel 80. This is because of the gap in the detachment direction between the engagement portion 88 and the boundary portion of the connecting portion 58 and engagement portion 60 of the second latch pawl 50 and because of the gap in the radial direction of the cover 20 between the connecting portion 58 of the second latch pawl 50 and the inner circumferential surface 83 of the wheel 80. Therefore, the elastic deformation portion 51 of the second latch pawl 50 is not elastically deformed.

When the heat generated by the brake operation of the vehicle is transferred from the axle to the wheel center cap 10 through the wheel 80, the cover 20 is expanded (elongated) toward the outside in the radial direction of the cover 20 by the heat transferred to the wheel center cap 10 while the attachment hole 82 is expanded (elongated) toward the outside (direction perpendicular to the attachment) in the radial direction of the cover 20 by the heat transferred to the wheel 80.

Assuming that LC is a diameter of the cover 20 and $\alpha C$ is a linear expansion coefficient of the cover 20, an elongation DC of a radius of the cover 20 becomes $DC=(LC/2)\times\alpha C\times\Delta T$ when the temperature at the wheel center cap 10 is raised by a temperature $\Delta T$ to the assumed maximum temperature (for example, 130° C.).

Assuming that LH is a diameter of the attachment hole 82 and $\alpha H$ is a linear expansion coefficient of the wheel 80, an elongation DH of a radius of the attachment hole 82 becomes $DH=(LH/2)\times\alpha H\times\Delta T$ when the temperature at the wheel 80 is raised by a temperature $\Delta T$ to the assumed maximum temperature (for example, 130° C.).

The wheel 80 is made of aluminum, and the wheel center cap 10 is made of resin. Therefore, because the linear expansion coefficient of the resin is larger than the linear expansion coefficient of the aluminum, the elongation DH of the radius of the cover 20 is larger than the elongation DH of the radius of the attachment hole 82. Accordingly, the outer circumferential surface 22 of the cover 20 is moved (brought close to) in the radial direction relative to the inner circumferential surface 83 of the wheel 80. At this point, a movement amount D becomes $D=DC-DH$.

Figure 4:
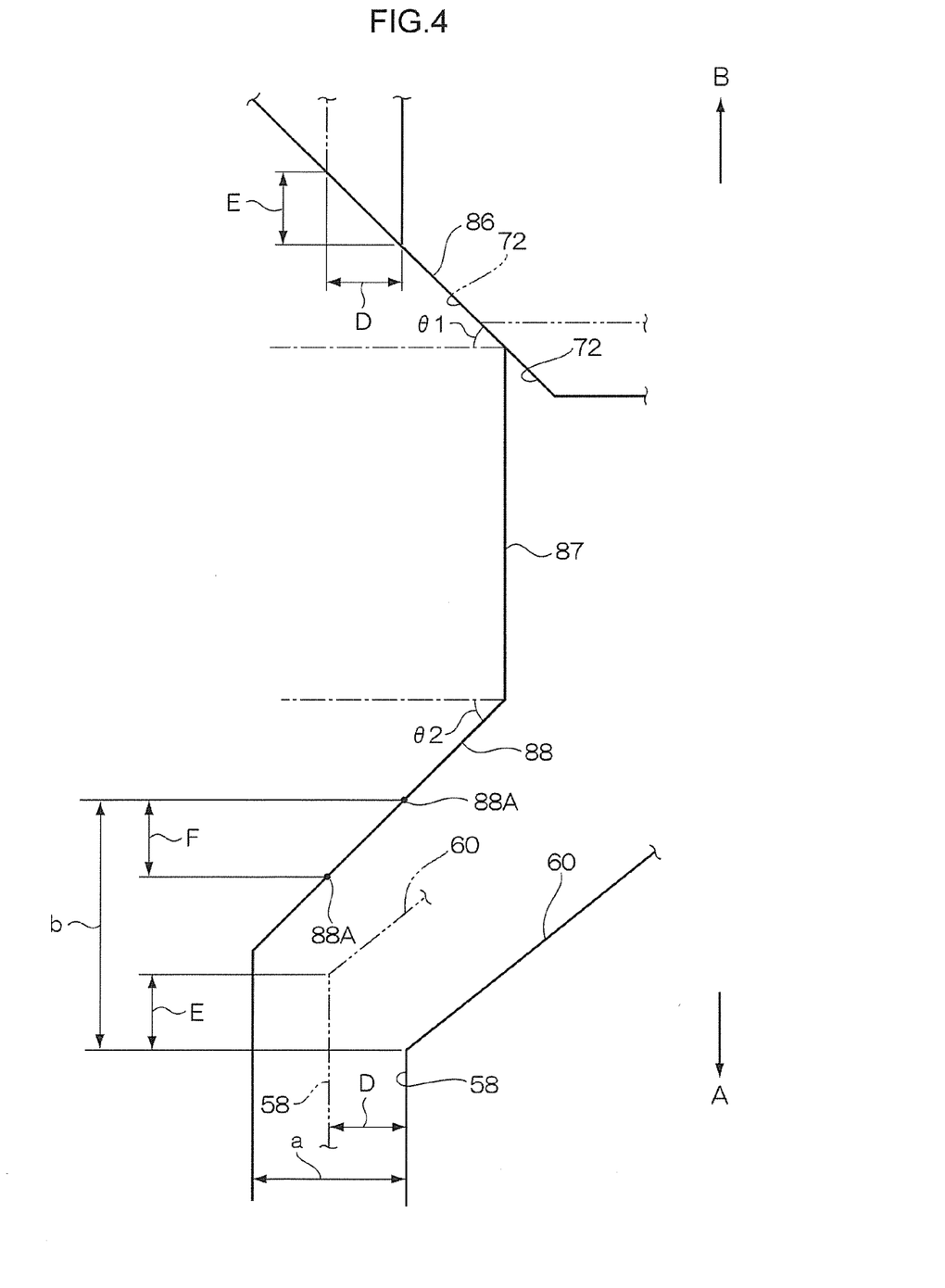
FIG. 4 is a conceptual view illustrating movements of leading end portions of a slide pawl and a second latch pawl when heat is provided to a wheel center cap according to an exemplary embodiment of the invention.

As illustrated in FIG. 4, when the outer circumferential surface 22 of the cover 20 is moved in the radial direction relative to the inner circumferential surface 83 of the wheel 80, the slope portion 72 of the slide pawl 70 is slid toward the outside in the radial direction of the cover 20 with respect to the slope portion 86 of the wheel 80, whereby the wheel center cap 10 is moved in the detachment direction relative to the inner circumferential surface 83 of the wheel 80. At this point, a movement amount E becomes $E=D\times\tan\theta 1$.

Therefore, the second latch pawl 50 is moved by the movement amount E in the detachment direction while moved by the movement amount D toward the outside in the radial direction of the cover 20 with respect to the wheel 80.

The leading end portion of the second latch pawl 50 is moved toward the outside in the radial direction of the cover 20 with respect to the wheel 80, whereby a region 88A of the engagement portion 88 of the wheel 80 is displaced toward the outside in the radial direction of the cover 20 and in the attachment direction. The boundary portion of the connecting portion 58 and engagement portion 60 of the second latch pawl 50 is opposite the region 88A of the engagement portion 88 in the detachment direction. At this point, a displacement amount F of the region 88A in the attachment direction becomes F=D×tan θ2.

Therefore, the boundary portion of the connecting portion 58 and the engagement portion 60 is brought close to the engagement portion 88 of the wheel 80 by a movement amount G in the detachment direction while brought close to the inner circumferential surface 83 of the wheel 80 by a movement amount D toward the outside in the radial direction of the cover 20. At this point, the movement amount G becomes G=E+F.

A gap size a in the radial direction of the cover 20 between the connecting portion 58 of the second latch pawl 50 and the inner circumferential surface 83 of the wheel 80 is larger than the movement amount D. Therefore, the connecting portion 58 of the second latch pawl 50 does not abut on the inner circumferential surface 83 of the wheel 80. A gap size b in the detachment direction between the boundary portion, which is of the connecting portion 58 and engagement portion 60 of the second latch pawl 50, and the engagement projection 84 of the wheel 80 is larger than the movement amount G. Therefore, the boundary portion of the connecting portion 58 and engagement portion 60 of the second latch pawl 50 does not abut on the engagement portion 88 of the wheel 80. Accordingly, the second latch pawl 50 is not elastically deformed, even if the temperatures at the wheel center cap 10 and wheel 80 are raised to the assumed maximum temperature (for example, 130° C.) to expand the wheel center cap 10 and the wheel 80.

On the other hand, when the wheel center cap 10 is detached from the wheel 80, the wheel center cap 10 is drawn toward the detachment direction side while the center shaft line of the wheel center cap 10 is aligned with the center shaft line of the attachment hole 82 of the wheel 80.

At this point, the engagement portion 40 of the first latch pawl 30 is slid in the boundary portion of the connecting portion 87 and engagement portion 88 of the wheel 80. Therefore, the engagement portion 40 is pressed toward the inside in the radial direction of the wheel 80 by the boundary portion of the connecting portion 87 and the engagement portion 88, and the elastic deformation portion 31 of the first latch pawl 30 is elastically deformed toward the inside in the radial direction of the cover 20. Accordingly, the first latch pawl 30 causes the load to act on the wheel center cap 10 such that the wheel center cap 10 is detached from the wheel 80.

At this point, the boundary portion of the connecting portion 58 and engagement portion 60 of the second latch pawl 50 is slid with respect to the engagement portion 88 of the wheel 80. Therefore, the boundary portion of the connecting portion 58 and the engagement portion 60 is pressed toward the inside in the radial direction of the wheel 80 by the engagement portion 88, and the elastic deformation portion 51 of the second latch pawl 50 is elastically deformed toward the inside in the radial direction of the cover 20. Accordingly, the second latch pawl 50 causes the load to act on the wheel center cap 10 such that the wheel center cap 10 is detached from the wheel 80.

The cover 20 is prevented from being bent while projected toward the detachment direction side by the ribs 76A and the rib 76B when the elastic deformation portion 31 of the first latch pawl 30 and the elastic deformation portion 51 of the second latch pawl 50 are elastically deformed.

As described above, the elastic deformation portion 51 of the second latch pawl 50 is not elastically deformed while the wheel center cap 10 is attached to the wheel 80. Therefore, because the bending stress does not act on the second latch pawl 50, the deformation due to the thermal creep can be suppressed in the second latch pawl 50 even if the heat is provided to the second latch pawl 50. Accordingly, the load on which the wheel center cap 10 is detached from the wheel 80 can be secured.

When the temperatures at the wheel center cap 10 and wheel 80 are raised to the assumed maximum temperature (for example, 130° C.), the cover 20 and the attachment hole 82 are expanded toward the outside in the radial direction, and the slope portion 72 of the slide pawl 70 is slid toward the outside in the radial direction of the cover 20 with respect to the slope portion 86 of the wheel 80. Therefore, the boundary portion of the connecting portion 58 and engagement portion 60 of the second latch pawl 50 is brought close to the engagement portion 88 of the wheel 80 by the movement amount G in the detachment direction while brought close to the inner circumferential surface 83 of the wheel 80 by the movement amount D toward the outside in the radial direction of the cover 20.

At this point, the connecting portion 58 of the second latch pawl 50 does not abut on the inner circumferential surface 83 of the wheel 80 because the gap size a in the radial direction of the cover 20 between the connecting portion 58 of the second latch pawl 50 and the inner circumferential surface 83 of the wheel 80 is larger than the movement amount D. The boundary portion of the connecting portion 58 and engagement portion 60 of the second latch pawl 50 does not abut on the engagement portion 88 of the wheel 80 because the gap size b in the detachment direction between the boundary portion, which is of the connecting portion 58 and engagement portion 60 of the second latch pawl 50, and the engagement projection 84 of the wheel 80 is larger than the movement amount G. Because the bending stress does not act on the second latch pawl 50, the deformation due to the thermal creep can be suppressed in the second latch pawl 50, and therefore the load on which the wheel center cap 10 is detached from the wheel 80 can be secured.

The ribs 76A and the rib 76B are provided in the cover 20, and the ribs 76A and the rib 76B connect the second latch pawls 50 that are opposite in the radial direction of the cover 20. Therefore, the bending load is enhanced by the ribs 76A and the rib 76B when the elastic deformation portion 51 of the second latch pawl 50 is elastically deformed toward the inside in the radial direction of the cover 20. The bending of the cover 20 is suppressed by the ribs 76A and the rib 76B when the second latch pawl 50 is elastically deformed, which allows the deformation of the cover 20 to be suppressed when the wheel center cap 10 is detached from the wheel 80. Therefore, the load on which the wheel center cap 10 is detached from the wheel 80 can further be secured.

In the exemplary embodiment, the gap size a is larger than the movement amount D, and the gap size b is larger than the movement amount G (G=E+F). Because the movement amount E is D×tan θ1 while the movement amount F is D×tan θ2, the gap size a, and the gap size b can be set by changing the angle θ1 and the angle θ2.

For example, when the angle θ1 and the angle θ2 are set to 45 degrees, the movement amount E becomes the movement amount D, and the movement amount F becomes the movement amount D. Accordingly, the gap size b is set double the gap size a.

In the exemplary embodiment, the gap size a is larger than the movement amount D, and the gap size b is larger than the movement amount G. Alternatively, assuming that c is a gap size in the radial direction of the cover 20 between the inner circumferential surface 83 of the wheel 80 and the outer circumferential surface 22 of the cover 20 (see FIG. 3), b>G+c×tan θ1+c×tan θ2 may hold in the case of a>D+c. Therefore, for example, because of variations in sizes of the slope portion 72 of the slide pawl 70 and the slope portion 86 of the wheel 80, even if the cover 20 is attached to the wheel 80 while deviated toward the outside in the radial direction of the cover 20, the abutment of the leading end portion of the second latch pawl 50 on the inner circumferential surface 83 of the wheel 80 can securely be prevented when the heat is attached to the wheel center cap 10.

In the exemplary embodiment, the slide pawl 70 is provided as the member different from the first latch pawl 30 and the second latch pawl 50. Alternatively, the slide pawl 70 may be configured to be integrated with the first latch pawl 30 or the second latch pawl 50. Therefore, the elastic deformation load of the first latch pawl 30 or second latch pawl 50 is enhanced because the length (width) of the first latch pawl 30 or second latch pawl 50 can be increased in the circumferential direction of the cover 20. Accordingly, the load on which the wheel center cap 10 is detached from the wheel 80 can be secured.

In the exemplary embodiment, even if the temperature at the wheel center cap 10 is raised to the assumed maximum temperature (for example, 130° C.), the leading end portion of the second latch pawl 50 does not abut on the inner circumferential surface 83 and engagement projection 84 of the wheel 80 because of the gap size a and the gap size b, and therefore the elastic deformation portion 51 of the second latch pawl 50 is not elastically deformed by the wheel 80. Alternatively, when the temperature at the wheel center cap 10 is raised to the assumed maximum temperature, the elastic deformation portion 51 of the second latch pawl 50 is not elastically deformed by the wheel 80, but the leading end portion of the second latch pawl 50 may abut on the inner circumferential surface 83 and engagement projection 84 of the wheel 80.

What is claimed is:

1. A cap attachment structure, comprising:
   a cap that is attached to a wheel of a vehicle;
   a first elastic deformation portion that is provided at the cap, the first elastic deformation portion being elastically deformed and engaging with the wheel while the cap is attached to the wheel;
   a second elastic deformation portion that is provided at the cap, the second elastic deformation portion not abutting the wheel and not being elastically deformed while the cap is attached to the wheel, and the second elastic deformation portion being elastically deformed by engaging with the wheel when the cap is detached from the wheel,
   a slid portion that is provided at the wheel, and
   a sliding portion that is provided at the cap and angularly offset from the first elastic deformation portion,
   wherein the slid portion abuts the first elastic deformation portion and the sliding portion abuts the slid portion and the first elastic deformation portion while the cap is attached to the wheel,
   wherein the second elastic deformation portion is moved without being elastically deformed by the wheel after the cap is attached to the wheel and a temperature at the cap is raised to an assumed maximum temperature and the cap expands while the cap is attached to the wheel, and the second elastic deformation portion is moved without being elastically deformed by the wheel when the temperature at the cap is raised to the assumed maximum temperature and the cap expands and slides the sliding portion on the slid portion while the cap is attached to the wheel.

2. The cap attachment structure of claim 1, further comprising a reinforcement portion that is provided at the cap that includes a plurality of the second elastic deformation portions, the reinforcement portion reinforcing the cap while connecting the second elastic deformation portions.

3. A cap, comprising:
   a main body portion that is attached to a wheel of a vehicle;
   a first elastic deformation portion that is provided at the main body portion, the first elastic deformation portion being elastically deformed and engaging with the wheel while the main body portion is attached to the wheel;
   a second elastic deformation portion that is provided at the main body portion, the second elastic deformation portion not abutting the wheel and not being elastically deformed while the main body portion is attached to the wheel, and the second elastic deformation portion being elastically deformed by engaging with the wheel when the main body portion is detached from the wheel,
   a slid portion that is provided at the wheel, and
   a sliding portion that is provided at the cap and angularly offset from the first elastic deformation portion,
   wherein the slid portion abuts the first elastic deformation portion and the sliding portion abuts the slid portion and the first elastic deformation portion while the cap is attached to the wheel, and
   wherein the second elastic deformation portion is moved without being elastically deformed by the wheel after the cap is attached to the wheel and a temperature at the main body portion is raised to an assumed maximum temperature and the main body portion expands while the main body portion is attached to the wheel, and the second elastic deformation portion is moved without being elastically deformed by the wheel when the temperature at the main body portion is raised to the assumed maximum temperature and the main body portion expands and slides the sliding portion on the slid portion provided at the wheel while the main body portion is attached to the wheel.

4. The cap of claim 3, further comprising a reinforcement portion that is provided at the main body portion that includes a plurality of the second elastic deformation portions, the reinforcement portion reinforcing the second elastic deformation portions and the main body portion while connecting the second elastic deformation portions.

* * * * *